R. I. BLANCHARD.
CASE FOR STORING FORKS AND SPOONS.
APPLICATION FILED DEC. 17, 1913.

1,101,247.

Patented June 23, 1914.

2 SHEETS—SHEET 1.

WITNESSES
Ada P. Hagerly.
Elsie B. Dana.

INVENTOR
Raymond I. Blanchard
by Joseph A. Miller
Attorney

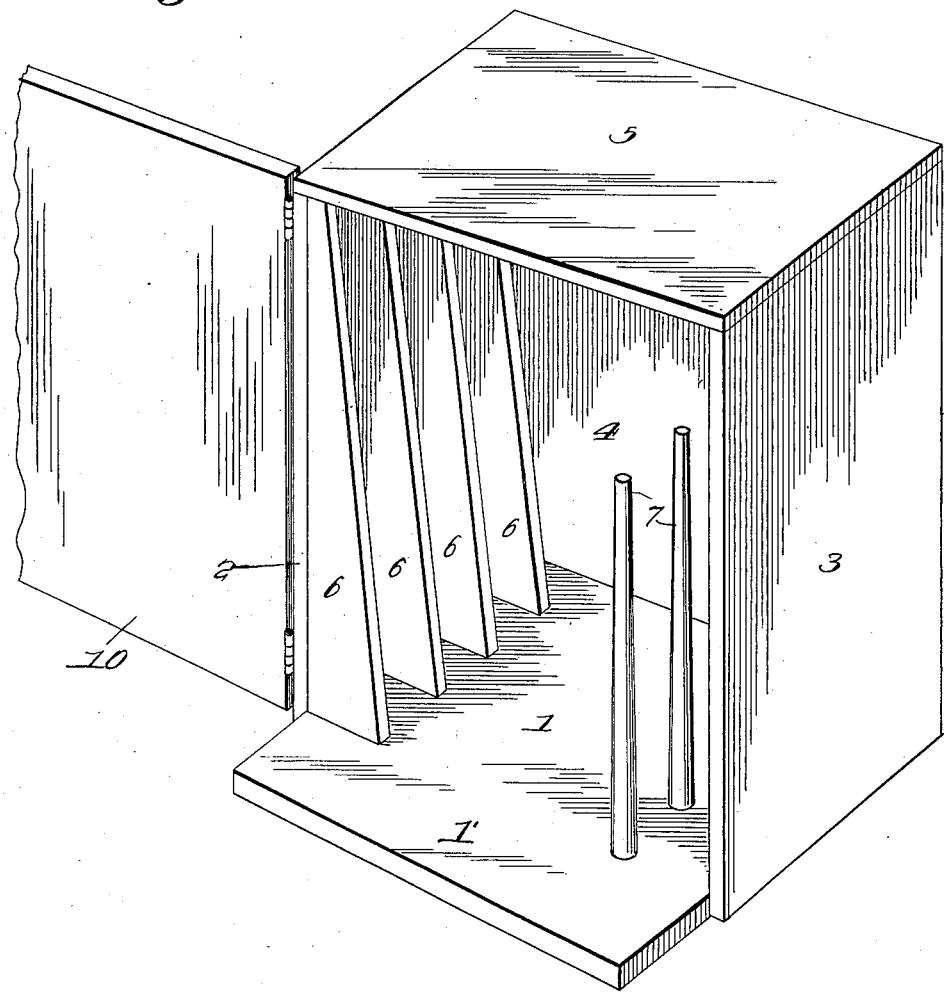

UNITED STATES PATENT OFFICE.

RAYMOND IRVING BLANCHARD, OF PROVIDENCE, RHODE ISLAND, ASSIGNOR TO GORHAM MANUFACTURING COMPANY, OF PROVIDENCE, RHODE ISLAND, A CORPORATION OF RHODE ISLAND.

CASE FOR STORING FORKS AND SPOONS.

1,101,247. Specification of Letters Patent. Patented June 23, 1914.

Application filed December 17, 1913. Serial No. 807,219.

*To all whom it may concern:*

Be it known that I, RAYMOND IRVING BLANCHARD, a citizen of the United States, residing at Providence, in the county of Providence, and State of Rhode Island, have invented a new and useful Improvement in Cases for Storing Forks or Spoons, of which the following is a specification.

This invention relates to certain new and useful improvements in cases for storing forks or spoons, and the primary object of the invention is to provide a case which permits of the storage of forks, or spoons in stacks and in such manner that one or all of the stacks may be easily and quickly removed, as desired.

Further, the invention aims to provide a case of the type set forth which is of simple and economical construction, and which enables the forks or spoons to be compactly assembled.

Figure 1:
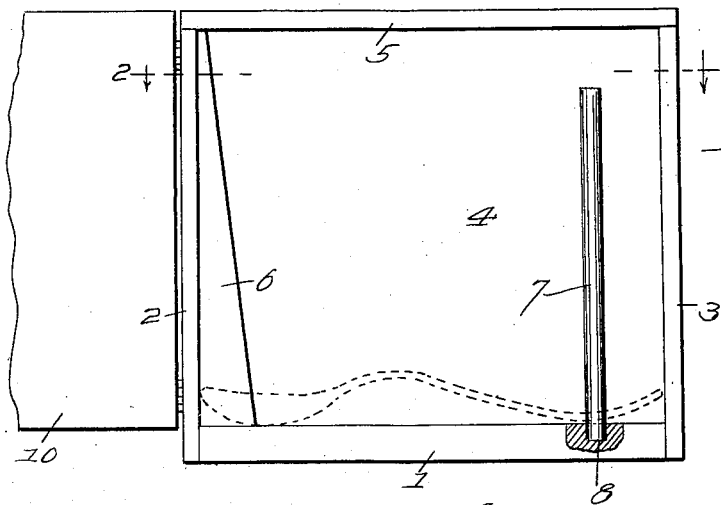
Figure 2:
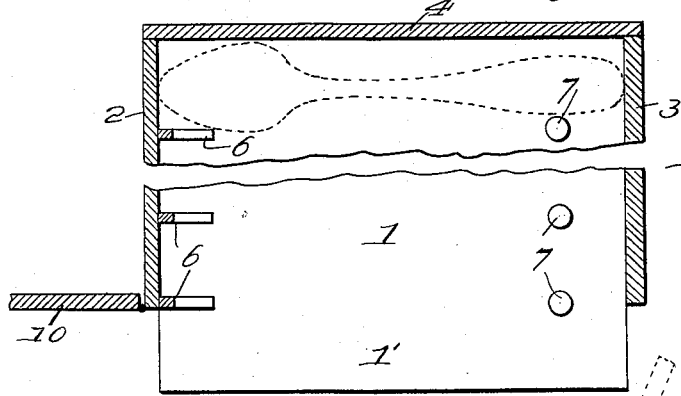
Figure 3:
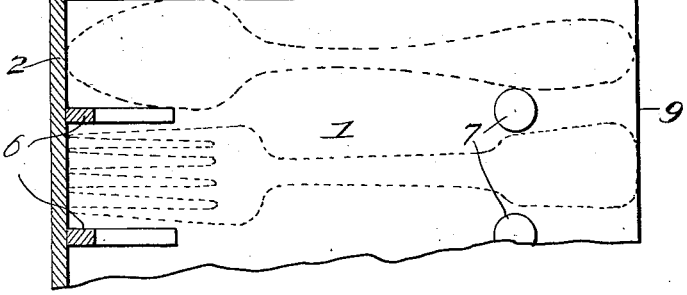

In the drawings—Figure 1 is an end elevation of the invention, partly broken away and in section. Fig. 2 is a section taken on the line 2—2 of Fig. 1. Fig. 3 is a fragmentary view similar to Fig. 2 of a modified form of the invention, and Fig. 4 is a perspective view of the invention.

The case proper consists of a bottom 1, sides 2 and 3, an end 4 and a top 5. To the side 2 a series of vertical partitions 6 are secured, which partitions extend from the bottom 1 to the top 5, as shown in Fig. 1. The partitions 6 are secured in spaced relation to each other and at sufficient distances apart to receive the bowls of the spoons, or the tines of the forks, the free ends of the spoon bowls or the free ends of the fork tines abutting the side 2, as depicted in all figures of the drawings. The partitions 6 preferably taper upwardly from their lower to their upper ends, in order to more readily and easily permit of the removal of the spoons or forks. The handles of the spoons or forks are engaged and held in proper relation to the partitions, by means of uprights or vertical rods 7, which latter have their lower ends removably secured in apertures 8 provided therefor in the bottom 1 and which coöperate with the partitions to form stalls in which the spoons or forks are held. The rods 7 are arranged in spaced relation at such distances apart as to receive the handles of the spoons or forks, as shown in Figs. 2 and 3 of the drawings.

In Fig. 3 of the drawings the bottom 1 is shown as being provided with a side extension 9 which projects beyond the end wall 4 and which may be left completely open so as to expose the ends of the spoon or fork handles, to enable same to be readily open to inspection. If desired, however, the side may be closed in any suitable manner, for instance by a door 10'.

In operation the spoons or forks are stacked, or arranged in superimposed order within the respective stalls which the partitions and pins provide, forks or spoons of the same style or type being placed within a stall. When it is desired to remove a stack, the pin 7 adjacent same is pulled up and out of its aperture or socket 8, whereupon the entire stack may be removed and in this manner the entire case or any portion thereof may have the spoons or forks removed therefrom.

As depicted in Figs. 2 and 4 of the drawings, the bottom 1 is provided with an extension 1', and a door 10 is hinged to the side 2 so as to close the open end of the case, the extension 1' as well as the extension 9 aforementioned, being for the purpose of permitting the stacks to be slid or moved upon said extensions in the act of removing the stacks from the case. In each instance, the doors where employed swing over the upper faces of the respective extensions.

Having thus described my invention, I claim as new and desire to secure by Letters Patent;—

1. In a case for storing forks or spoons or the like, a case proper, a series of spaced vertical partitions secured to one side wall of the case and extending from the bottom to the top thereof and being tapered from the bottoms of the partitions toward the tops thereof, and a series of removable pins arranged in spaced relation adjacent to the opposite side wall of the casing.

2. In a case for storing forks or spoons or the like, a case proper having stalls formed therein the walls of the outer ends of which are removable, and the walls of the inner ends of which are fixed.

3. In a case for storing forks or spoons or the like, a case proper, spaced vertical partitions rigidly affixed to the case at one side thereof, and removable rods at the other side of the case having their lower ends engaged in sockets provided therefor in the bottom of the case.

4. A case for storing forks or spoons or the like including partitions at one side of the case and removable elements at the opposite side of the case which elements coöperate with the partitions to form stalls in which the forks or spoons or the like are stacked.

In testimony whereof I have signed my name to this specification in the presence of two subscribing witnesses.

RAYMOND I. BLANCHARD.

Witnesses:
ADA E. HAGERTY,
J. A. MILLER.